United States Patent
Ruppe, Jr.

[15] 3,692,150
[45] Sept. 19, 1972

[54] OXIDATION BARRIER FOR A CARBON FRICTION DISC

[72] Inventor: Joseph P. Ruppe, Jr., South Bend, Ind.

[73] Assignee: The Bendix Corporation

[22] Filed: Oct. 26, 1970

[21] Appl. No.: 84,027

[52] U.S. Cl..............188/71.5, 188/73.2, 188/251 A, 192/107 M
[51] Int. Cl...........................................F16d 55/36
[58] Field of Search.188/73.2, 251 R, 251 A, 251 M, 188/218 XL, 715; 192/107 M

[56] References Cited
UNITED STATES PATENTS
3,639,197  2/1972  Spain.................188/251 A
3,552,533  1/1971  Nitz......................188/251 A
3,473,637  10/1969  Rutt......................188/251 R Primary Examiner—George E. A. Halvosa
Attorney—William N. Antonis and Plante, Hartz, Smith & Thompson

[57] ABSTRACT

A carbon friction disc for a brake assembly having woven strips of carbon secured to the periphery thereof which is subjected to radial forces. The woven strip provides the carbon disc with the structural resistance which is necessary to inhibit oxidation of this periphery during high temperature operation of the friction disc.

4 Claims, 5 Drawing Figures

PATENTED SEP 19 1972 3,692,150

INVENTOR.
JOSEPH P. RUPPE, JR.
BY Plante, Hartz, Smith
& Thompson
ATTORNEYS

OXIDATION BARRIER FOR A CARBON FRICTION DISC

BACKGROUND OF THE INVENTION

In conventional braking devices, a rotating member is normally brought into frictional engagement with a stationary member whereupon kinetic energy is converted to thermal energy. The friction discs of the rotating and stationary members must be capable of dissipating or absorbing the thermal energy produced by engagement to produce a uniform transition of the kinetic to thermal energy.

It has been recognized that a friction disc constructed of carbon possesses the desired heat capacity, thermal conductivity and coefficient of friction. However, carbon has low tensile and shear strength and at high temperature will oxidize thereby destroying the friction disc. Carbon friction discs are commonly constructed of a composite consisting of a carbon fiber and a carbon binder. At elevated temperatures, the oxidation phenomenon is exhibited as removal of the carbon binder from the carbon fibers since the binder has a greater affinity to heat thus destroying the integrity of the composite. In brake discs, the oxidation effect is concentrated on the peripheral regions, outside the swept or rubbing region.

In the prior art to prevent the oxidation in the non-swept area of a carbon friction disc a steel ring was press fitted around the outer periphery. During frictional operation when the thermal energy produced was low, the unit operated effectively. As the temperature increased, the unity of the carbon disc and steel ring changed in direct proportion to the thermal coefficient of expansion. After a repeated number of frictional engagements, high temperatures were produced and structural defects occurred along the periphery of the carbon disc because of the different coefficients of expansion.

SUMMARY OF THE INVENTION

As the size of aircraft keeps increasing, the ever present need for reduction of the over-all weight to provide the maximum payload is the ultimate design goal. I have invented a means to provide an aircraft brake assembly with a lightweight carbon friction disc. The friction disc may be constructed by any common fabrication technique including laminate lay-ups, three dimensional weaves or molded with randomly or preferentially oriented fibers. A high fiber density carbon belt or tape is secured to the periphery of the friction disc opposite the periphery through which the torque is transmitted to provide a barrier for preventing oxidation at high operational temperatures. The width of carbon barrier belt or tape will be equal to the thickness of the periphery of the carbon disc and of such thickness to provide structural resistance to any radial force received at the edge of carbon disc. In addition, the carbon barrier will provide a friction disc with the capacity for providing an effective braking area equal to the distance between the engaging keys on the wheel hub and the stationary member of the aircraft brake assembly. Thus, it would be possible to reduce the diameter of the aircraft wheel hub to further reduce the over-all weight of the aircraft.

It is therefore the object of this invention to provide a carbon friction disc with the structural capacity to withstand radial forces and to resist oxidation at high operating temperatures.

It is a further object to provide a friction disc member of several elements having the same coefficient of expansion whose strength remains substantially constant throughout an operational temperature range.

These and other objects will be apparent from reading the specification and viewing the drawings.

DETAILED DESCRIPTION OF THE PREFERRED EMBODIMENT

Figure 1:
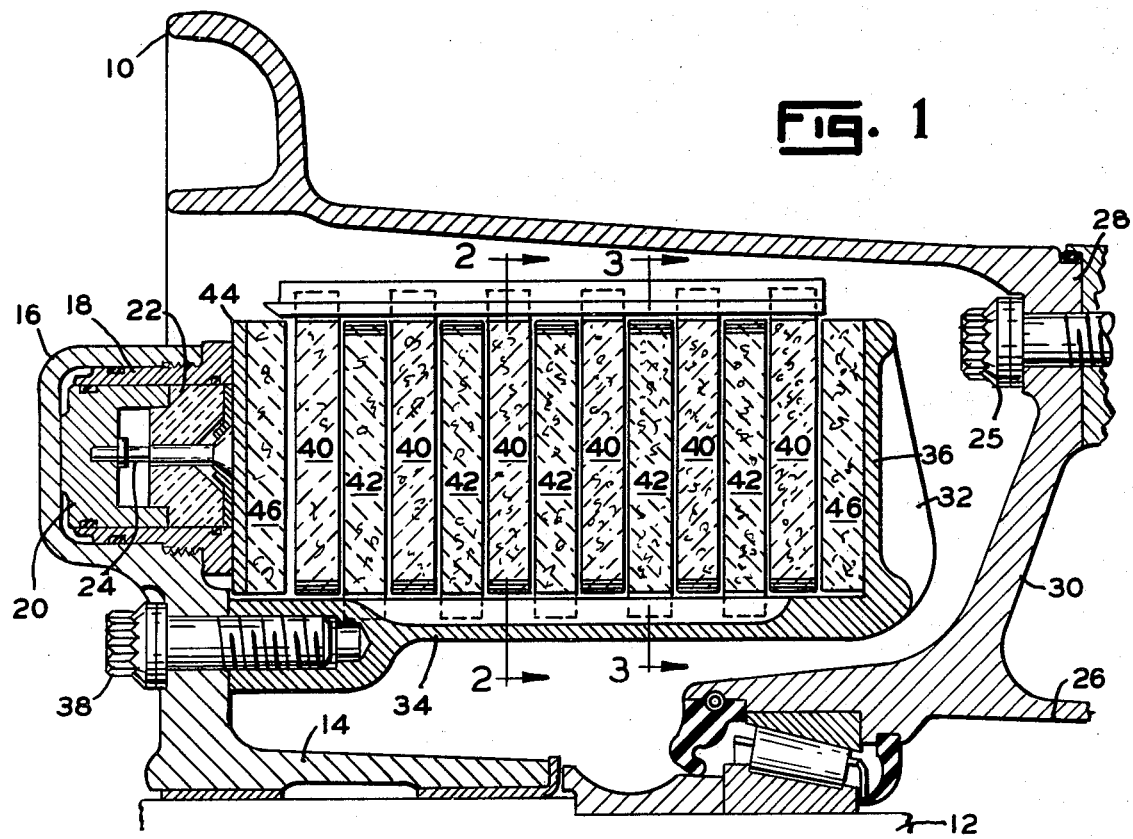
FIG. 1 is a sectional view of a portion of a symmetrical wheel and brake assembly which incorporates the invention.

The wheel and brake assembly shown in FIG. 1 includes a wheel 10 rotatably mounted on a stationary axle 12 having a stationary carrier member 14 fixed thereto by any suitable means, such as by a direct bolt connection (not shown). The construction for rotatably mounting wheel 14 to axle 12 and fixing the stationary carrier member 14 to the axle is well known, and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake which is illustrated is of the disc type and includes a plurality of interleaved rotors 40, which are splined to and are rotated by the aircraft wheel 10, and includes stators 42, which are splined to sleeve 34 of the torque tube 32. The specific novel construction of the rotors will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motor 16, forces the rotors 40 and stators 42 against each other upon actuation of the motors by thrusting at one side of the stack and biasing the entire stack against the backing plate 36. Pressure plate 44 and backing plate 36 each have a frictional carbon disc 46 attached thereto of a type hereinafter fully described in conjunction with rotors 40 and stators 42.

Figure 2:
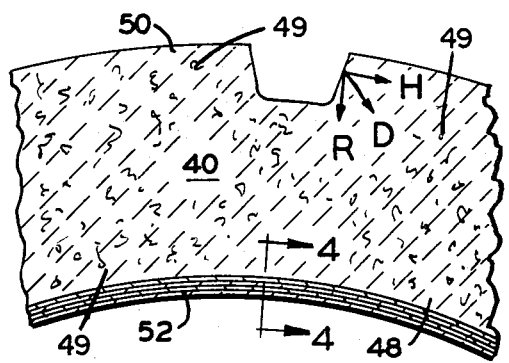
FIG. 2 is a sectional view taken along line 2—2 of FIG. 1 showing the carbon barrier affixed to the inner periphery of a carbon disc.

Each of the rotors 40 consist of a solid carbon disc 48 of molded fibers 49 having a series of key-slot notches 50 located along the outer periphery as shown in FIG. 2. Each of these notches slidably engage axially extending keys located on the inner periphery of the aircraft wheel 10. It will be understood that, if desired, the key-slot arrangement of the rotor could be reversed.

Figure 4:
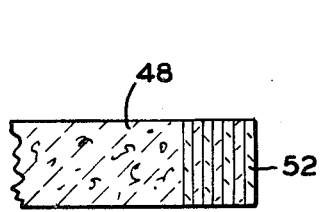
FIG. 4 is a sectional view taken along line 4—4 of FIG. 2 showing a frictional disc in an abutting relationship to a carbon barrier belt.

A woven carbon barrier means 52, such as a high density graphite, carbon fiber belt or tape, is attached to the periphery of the carbon disc 48 opposite the key-slot notches 50. The carbon barrier belt will be attached during fabrication of the disc to form an integral unit, such as shown in FIG. 4, wherein a carbon disc 48 sealingly abuts a carbon barrier 52. The thickness of the carbon barrier 52, whose width is equal to the thickness of the carbon disc at its periphery is designed to resist the inward radial load component R which results in compression loading of the carbon disc 48 by driving force D transmitted along the taper of the key from the rotating wheel 10. By pre-stressing the carbon barrier belt 52 which is located along the inner periphery of the carbon disc 48, the structural unity of the disc will be maintained even though the radial component R of the driving force D increases.

Figure 3:
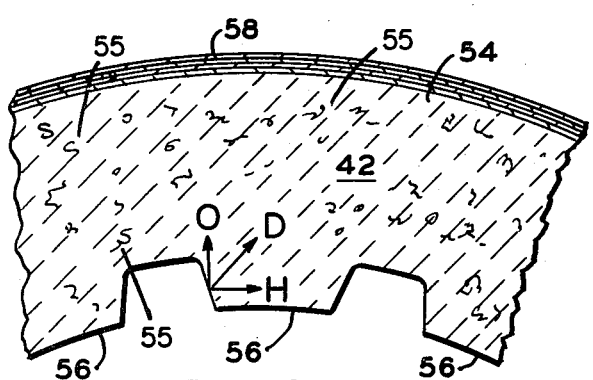
FIG. 3 is a sectional view taken along line 3—3 of FIG. 1 showing the carbon barrier affixed to the outer periphery of a carbon disc.

Each of the stators 42 consists of a solid carbon disc 54 of molded fibers 55 having a series of key-slot notches 56 located along the inner periphery, as shown in FIG. 3. Each of these notches slidably engage axially extending keys preferably formed as integral parts of the torque absorbing sleeve 34. It will be understood that, if desired, the key-slot arrangement of the stator could be reversed. A carbon barrier belt 58 of the same type used for the rotor is attached to the periphery of the carbon disc 54 opposite the key-slot notches 56. The thickness of the carbon barrier 58 is designed to resist the outward radial load component 0 which results in hoop tension along the outer periphery of the carbon disc 54 as a result of the driving force D transmitted through the taper of the key 56.

Figure 5:
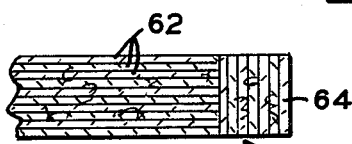
FIG. 5 is a cross sectional view, similar to FIG. 4, of a laminated carbon frictional disc with a carbon barrier belt affixed to the periphery.

An alternate frictional disc 60 for use as either a rotor or stator in a wheel and brake assembly is shown in FIG. 5. The frictional disc 60 is made up of a series of carbon wafer members 62 laminated together with the carbon barrier 64 sealingly secured to the periphery. Through this construction the thickness, strength and uniformity of the frictional disc 60 can be controlled with greater accuracy. The carbon wafer members 62 being laminated together will eliminate some of the voids which can occur when the discs are wholly molded. In addition, the strength of the disc 60 may be increased through the addition of a frictional securing agent as the carbon wafer members 62 and the barrier member 64 are combined into the unitary frictional disc 60.

The term "carbon" when so used is to be construed or interpreted in the broad or generic sense as meaning not only the various commercial grades of carbon on the market, but also the various commercial forms or grades of partially or fully graphitized carbon or graphite commonly available. Carbon has been frequently referred to as amorphous or essentially non-crystalline whereas graphite is often looked upon as the common crystalline form of carbon, diamond being the less common crystalline variety of carbon. However, it is generally recognized that there is no sharp or distinct dividing line, crystallographically speaking, between commercial grades of carbon and graphite, but there are various degrees of graphitization in carbon bodies, depending on the methods of fabrication, and particularly its thermal history. For purposes of this invention no distinction need be drawn between the two, and where reference is made to carbon, graphite is included, as pointed out above.

MODE OF OPERATION

In response to an operational signal pressure plate 44 is moved toward backing plate 36 by the fluid pressure motor 16. Since both the rotors 40 and the stators are constructed of the same type carbon disc and carbon barrier having matching coefficients of expansion, the area between the retaining keys on the wheel 10 and the sleeve 34 can be used as an effective braking surface. Because the carbon disc and woven carbon barrier have the same coefficient of expansion, a substantially uniform coefficient of friction will develop upon actuation. Because carbon retains its strength at the temperature created by frictional engagement of the rotors and stators a higher operational range can be utilized. With the carbon barriers 52 and 58 applied to the non-swept portion of rotors 40 and stators 42, oxidation of the carbon discs 48 and 54 at this high temperature is prevented. Thus, a lightweight, long lasting and effective friction type brake assembly is produced.

I claim:

1. In a wheel and brake assembly with key-slot type connecting means, frictional engagement means comprising:

a first solid carbon disc of molded fibers having first inner and outer peripheries, one of said first peripheries having mating means for operatively engaging said key-slot type connecting means;

a rotatable member of said key-slot connecting means operatively connected to said solid carbon disc, said rotatable member transmitting a radial force to said solid carbon disc;

a non-rotatable member of said key-slot connecting means;

a second solid carbon disc of molded fibers having second inner and outer peripheries, one of said second peripheries having mating means for operatively engaging the non-rotatable portion of said key-slot type connecting means;

a first woven carbon barrier secured to the other of said first peripheries for providing said first solid carbon disc with structural resistance to inhibit oxidation of said other periphery during high temperature operation, said first woven carbon barrier and first solid carbon disc of molded fibers having matching coefficients of expansion to thereby provide a substantially uniform coefficient of friction for the effective wear surface which extends from said mating means to the external edge of said first woven carbon barrier, said first woven carbon barrier being of a predetermined thickness to provide structural resistance to the radial forces transmitted through the first solid carbon disc during frictional engagement;

a second woven carbon barrier secured to the other of said second peripheries for providing said second solid carbon disc with structural resistance to inhibit oxidation of said second peripheries during high temperature operation, said second woven carbon barrier and said second solid carbon disc of molded fibers having matching coefficients of expansion to thereby provide a substantially uniform coefficient of friction for the effective wear surface which extended from said mating means to the external edge of said second woven carbon barrier, said second woven carbon barrier being of a predetermined thickness to provide structural resistance to the radial forces transmitted through the second solid carbon disc during frictional engagement; and actuating means for urging said first solid carbon disc into frictional engagement with said second solid carbon disc to provide an effective resistive surface of matched coefficient of friction, said first and second woven carbon barriers restraining the varying radial forces as the driving resistive forces are increased in response to the actuation means.

2. Friction means for a wheel and brake assembly, comprising:

a stationary cylindrical support member with a series of keys extending from the external surface of said support member;

a first solid carbon disc of molded fibers having an inner and an outer periphery with a series of slots located around said inner periphery, said slots of said first solid carbon disc mating with said keys of said support member to prevent said first solid carbon disc from rotating by permitting axial movement with respect to said support member;

a cylindrical hub member attached to a rotating body having a series of keys extending from the internal surface of said hub member;

a second solid carbon disc of molded disc of molded fibers having an inner and an outer periphery, said outer periphery having a series of slots, said slots of said second solid carbon disc mating with the keys in said hub member to permit axial movement of said second solid carbon disc along said keys while being rotated by said hub member;

actuating means for urging the rotatable second solid carbon disc into frictional engagement with the stationary first solid carbon disc, said first and second solid carbon discs generating thermal energy upon frictional engagement;

first woven carbon barrier means integrally secured to the outer periphery of said first solid carbon disc for providing structural support to withstand outward radial forces created by the resultant of the driving force acting through the stationary support member, and for inhibiting oxidation of said outer periphery caused by thermal energy created upon said frictional engagement; and second woven carbon barrier means integrally secured to the inner periphery of said second solid carbon disc for providing structural support to withstand inward radial forces created by the resultant of the driving force transferred through the cylindrical hub and for inhibiting oxidation of said inner periphery caused by thermal energy created upon said frictional engagement, said first solid carbon disc and woven carbon barrier means having a matching coefficient of expansion with the second solid carbon disc and woven carbon barrier means to provide a uniform resistive force upon frictional engagement.

3. The friction means, as recited in claim 2, wherein said first and second carbon discs and said first and second barrier means with matching coefficients of expansion permit a uniform structural relation throughout the thermal generating range caused by said frictional engagement.

4. The friction means, as recited in claim 3 wherein said first and second barrier means each include:

a series of laminated carbon fibers secured to the peripheries of said first and second carbon discs subjected to radial forces.

* * * * *